United States Patent Office 3,070,205
Patented Dec. 25, 1962

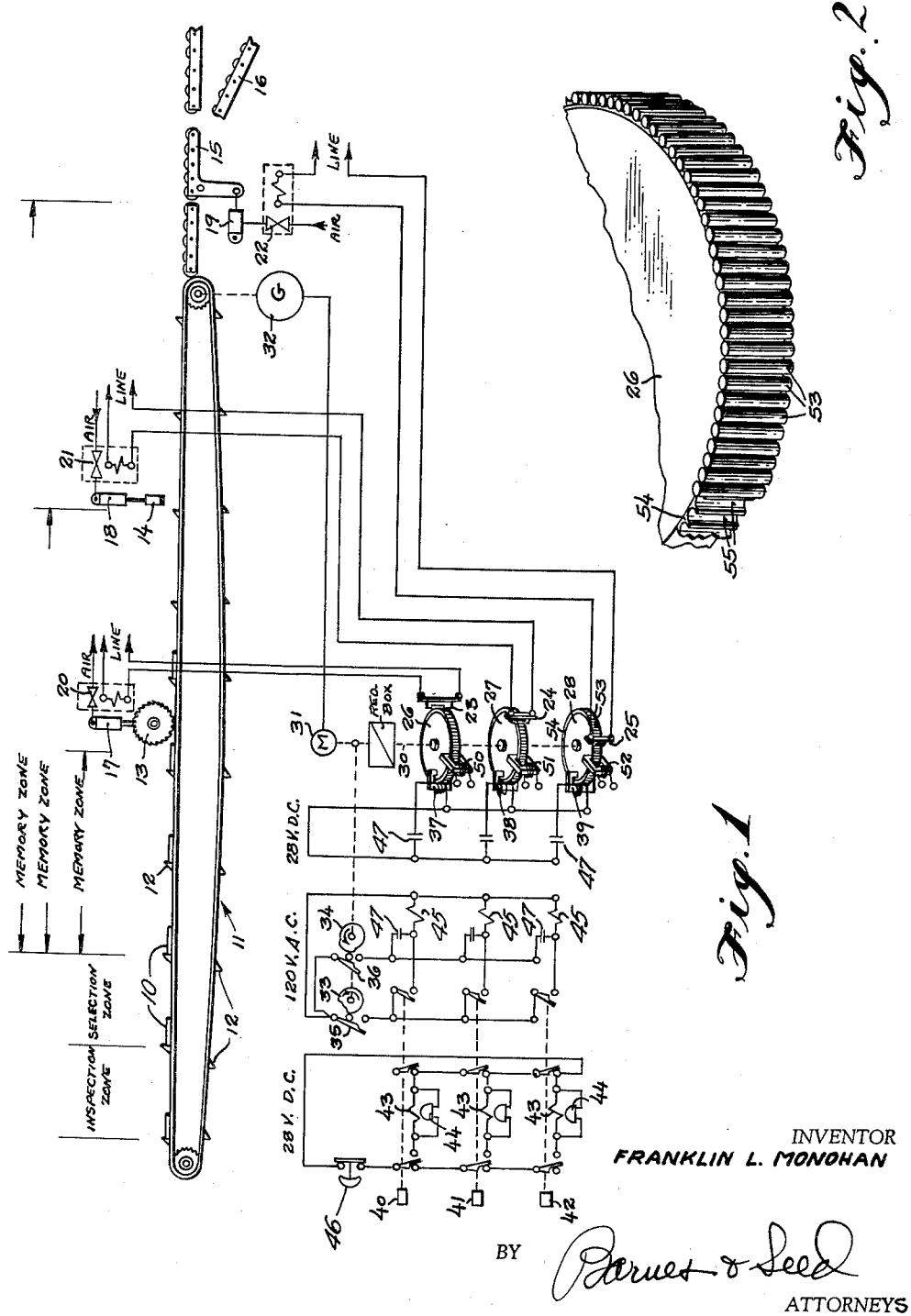

3,070,205
METHOD AND APPARATUS FOR CONTROLLING THE PROCESSING OF A CONVEYED OBJECT
Franklin L. Monohan, 6814 SE. 32nd St., Mercer Island, Wash.
Filed Feb. 18, 1960, Ser. No. 9,587
16 Claims. (Cl. 198—19)

This invention relates to a memory system for use in the processing of conveyed materials, and pertains more especially to a system by means of which processing information may be stored and later translated in terms of an action impulse so as to control the processing of an object moving with a conveyor.

The principal object of the invention is to provide a relatively simple system, peculiarized by its employment of magnetized travellers, which is capable of accomplishing the above end in an especially efficient manner.

More particular objects and advantages will appear and be understood in the course of the following description and claims, the invention consisting in the method by which processing information is stored and later translated and in the novel construction, adaptation and combination of parts for performing said method hereinafter described and claimed.

In said drawing:

FIGURE 1 is a schematic view illustrating a memory system constructed to embody the preferred teachings of the present invention; and FIG. 2 is a fragmentary perspective view of a control disc used in said system.

Referring to said drawing, it will be seen that there is exemplified a system of the type in which an item to be processed is carried by a mechanical conveyor to a succession of stations. Processing equipment occupies these stations. The item is processed as it traverses one or more of these stations, and this is to say that one item moving along the conveyor may properly call for one treatment while a following item or items may demand a different treatment. By way of example I have elected to show a saw-mill operation in which boards 10 are fed to an endless conveyor 11.

As the boards are carried by equidistantly spaced flights 12 along the upper run of the belt, the same are shown as passing, in succession, a saw or saws 13 and a grade marker or markers 14. Leaving the conveyor at the tail end of such upper run the boards feed over a waste gate 15 which is mounted for movement from a normally elevated position to a depressed position. The depressed position registers with a chute 16 leading to a refuse conveyor. The saw and the marker are mounted for vertical movement from a normal position elevated out of the travel path of the conveyed boards into and out of a depressed operating position.

I have represented the several said processing instruments, and namely the saw, marker, and gate, as being operated by a respective piston working in an air cylinder, as 17, 18 and 19, with pressure air being fed to and dumped from the cylinders by a respective solenoid valve, as 20, 21 and 22. The solenoids for said valves are included in a respective normally open D.C. electric circuit. Each said circuit is completed by a respective magnetic proximity switch, as 23, 24 and 25.

The proximity switches each together with two related magnetic core-and-coil combinations hereinafter to be described and which will be termed a "write head" and an "erase head," respectively, are each associated with a respective one of several "memory" discs denoted by 26, 27 and 28. Such discs are caused to rotate in unison with the conveyor so as to complete a single revolution as the conveyor moves through a full cycle of operation. The several discs are or may be carried by a single drive shaft 30 and are indicated as employing a syncro-motor 31 driven from a syncro-generator 32 in order to accomplish the described unitary motion as between conveyors and discs.

A drive is passed from the shaft 30 to a pair of cams 33 and 34, rotating the latter at a speed such that each completes one revolution as the conveyor travels substantially the distance between two adjacent flights 12. As can be clearly seen from an inspection of the wiring diagram the land portions of the two cams each act to open a normally closed switch, as 35 and 36, parent to power circuits for said write heads and said erase heads. The land of the cam 33, which may be termed a "start-to-write" cam, has an approximate 270° span. That of the cam 34, termed a "stop-write" cam, has an approximate 90° span. The two lands are placed so that the one approximately laps the other.

The "write" magnetic cores hereinbefore referred to which are related to the memory discs 26, 27 and 28 are designated by 37, 38, and 39, respectively. Each is a yoke-like structure having its yoke arms straddling the rim of the concerned disc, and is magnetized by an electric coil wound thereon. Said write cores occupy stationary positions but admit of being set at a selected position within the circumferential span of the concerned memory disc. The magnetizing electric-coil for each core is included in a respective one of several normally open D.C. circuits each completed by conjunctive action of said switch 36 and a manually depressed button, as 40, 41, and 42. Included in each of these circuits is a holding coil 43, an indicator lamp 44, and a relay 45. A "clear" button is designated by 46. 47 represents the switch mechanisms of the relays 45.

The magnetic "erase" cores hereinbefore referred to related to the memory discs 26, 27 and 28 are designated by 50, 51 and 52, respectively. Each is similarly a stationary yoke-like structure having its yoke arms straddling the rim of the concerned disc, and similarly has an electrically energized magnetizing coil wound thereon. The coils of said erase heads are each included in a normally complete A.C. circuit.

The discs of the present invention are composed of a non-ferrous material and about their perimeter have a continuous belt of closely-spaced ferrous pins 53 lying parallel with the rotary axis of the disc. A suitable composition for the pins is an alloy of cobalt, nickel, aluminum and iron, and the belt 54 by which they are carried is composed of plastic or other suitable material non-conductive to the transfer of electric current and may be produced either as a separate rim attachment or integral with the disc. In the form in which it is here shown the belt provides sockets 55 with which the pins find a removable snap fit.

The operation is one in which the conveyed boards successively traverse first an inspection zone, then a write zone, and then a memory zone in the course of their travel to the successively traversed processing stations. The operator, by inspecting each board in turn as the boards pass the inspection zone, determines the processing which is to be given to that particular board and "writes" these determined directives by depressing the related button or buttons 40—41—42. These preselected directives are imposed upon the concerned memory disc by the instrumentality of magnetizing one of the pins 53 or a group of such pins so located upon the disc as to pass the related proximity switch 23, 24 or 25 simultaneously with the traversal, by the concerned conveyed board, of the related processing instrument. The responsive closing of the proximity switch excites the coils of the associated solenoid valve 20, 21 or 22, responsively activating the related processing instrument 13, 14 or 15, as the case may be.

As the magnetized pin or group of pins proceeds beyond the proximity switch, the same pass through the field of the related erase head 50, 51 or 52. This field, being caused to rapidly vary in consequence of its A.C. current, removes most of the residual magnetism of magnetized pins, thus returning the latter to a normal nullified condition before the same again pass the write head. In this following revolution of the pins, the core of the write head may or may not have a magnetic field impressed thereon, depending of course upon whether the concerned "directive" button had been depressed for the next following board.

It will be apparent that any given memory disc need have only the number of pins thereon which are required to activate the related solenoid valve for the time interval which is needed by the concerned processing instrument in order to perform its intended function. It is necessary that the write head and the erase head be separated one from the other a distance correlated to the spacing, calculated in terms of time, between the two points in the travel of the board at which (1) the "magnetic" message is impressed on the pin or pins and (2) the processing is to be performed. The pin socket or sockets employed would in such case be such as to bring the pin to the read head at the exact moment required to process the travelling board. A continuous belt of pins has the advantage of adapting itself to any set of heads, requiring only that the position of the write head be adjusted with respect to the read head.

Further considering the example which I have here elected to show, it will be understood that a number of saws, or sets of saws, would ordinarily be provided so that any desired portion of a board may be removed at will or the board cut to predetermined lengths. These saws would desirably occupy a single station spaced apart transversely at regular intervals, and be independently governed by a respective memory disc. In such an installation, a respective waste gate would be provided for each of the several gaps between saws.

The description has been here expressly directed to a sawmill operation in the belief that clarity in an understanding of the invention is advanced by the specific description which a particular example permits. It is my intention that no limitations are to be implied therefrom or from the detailed description of the embodiment of the invention which I have shown therewith. Changes within the teachings of the invention will suggest themselves. The hereto annexed claims are to be given the broadest interpretation to which the employed language fairly admits.

What I claim, is:

1. In a system to control the processing of a conveyed object by subjecting the same to selective action of processing mechanisms occupying positions along the path travelled by the conveyed object, in combination with the conveyor and with the processing mechanisms, normally incomplete electric circuits related to said mechanisms each including an electrically operated device controlling the concerned mechanism, a respective memory device for each of said processing mechanisms mounted for cyclic motion and characterized in that a magnetic field may be impresed thereon, synchronizing operative interconnection between the conveyor and said memory devices, a respective magnetic proximity switch for completing said electric circuits located in proximity of the path travelled by a related said memory device so as to be activated by the magnetic field impressed thereon, means for impressing said magnetic fields upon the memory devices at a point in the travel of the later which is removed from the concerned proximity switch an interval, time considered, corresponding to the time interval by which the related processing mechanism is separated from the end limit of a selection zone traversed by the conveyed object in its travel to the processing mechanisms, and means for erasing said impressed magnetic fields during the time interval when the memory devices are travelling between the related proximity switch and the related impressing point.

2. In a system to control the processing of a conveyed object by subjecting the same to selective action of processing mechanisms occupying positions along the path travelled by the conveyed object, in combination with the conveyor and with the processing mechanisms, normally incomplete electric circuits related to said mechanisms each including an electrically operated device controlling the concerned mechanism, a respective memory device for each of said processing mechanisms mounted for cyclic motion and characterized in that a magnetic field may be impressed thereon, synchronizing operative interconnection between the conveyor and said memory devices, a respective electric control excited by a magnetic field operative by said excitation to complete said electric circuits and located in proximity of the path travelled by a related said memory device so as to be activated by the magnetic field impressed thereon, means for impressing said magnetic fields upon the memory devices at a point in the travel of the latter which is removed from the concerned electric control an interval, time considered, corresponding to the time interval by which the related processing mechanism is separated from the end limit of a selection zone traversed by the conveyed object in its travel to the processing mechanisms, and means for erasing said impressed magnetic fields during the time interval when the memory devices are travelling between the related electric control and the related impressing point.

3. In a system to control the processing of an object moving with an endless conveyor in which the processing is accomplished by subjecting the object to selective action of processing mechanisms occupying positions along the path travelled by the conveyed object, in combination with the endless conveyor and with the processing mechanisms, normally incomplete electric circuits related to said mechanisms each including an electrically operated device controlling the concerned mechanism, a respective memory device for each of said processing mechanisms mounted for cyclic motion and characterized in that a magnetic field may be impressed thereon, synchronizing operative interconnection between the conveyor and said memory devices so that the cycling periods are identical, a respective magnetic proximity switch for completing said electric circuits located in proximity of the path travelled by a related said memory device so as to be activated by the magnetic field impressed thereon, means for impressing said magnetic fields upon the memory devices at a point in the travel of the latter which is removed from the concerned proximity switch an interval, time considered, exactly corresponding to the time interval by which the related processing mechanism is separated from the end limit of a selection zone traversed by the conveyed object in its travel to the processing mechanisms, and means for erasing said impressed magnetic fields during the time interval when the memory devices are travelling between the related proximity switch and the related impressing point.

4. The control system recited in claim 3 in which the memory devices each comprise a respective non-ferrous rotary disc provided on at least a part of its perimeter with a ferrous element capable of receiving and maintaining said impressed magnetic field.

5. The control system of claim 3 in which the memory devices each comprise a respective non-ferrous rotary disc provided on its perimeter with at least one ferrous pin disposed parallel to the rotary axis of the disc.

6. The control system recited in claim 3 in which the memory devices each comprise a respective non-ferrous disc provided throughout its periphery with a succession of closely spaced ferrous pins each disposed parallel to the rotary axis of the disc.

7. A control system according to claim 1 in which the memory devices each comprise a respective non-ferrous rotary disc provided on at least a part of its perimeter with a ferrous element capable of receiving and maintaining said impressed magnetic field, the means for impressing said magnetic fields comprising a respective core-and-coil combination included in a respective D.C. electric circuit, the means for erasing said impressed magnetic fields comprising a respective core-and-coil combination included in an A.C. electric circuit.

8. A control system as recited in claim 7 characterized in that the D.C. core-and-coil combinations each admit of being stationed in a selected circumferentially adjusted position within a given arc projected about the rotary axis of the related disc as a center.

9. A control system as recited in claim 1 in which the memory devices each comprise a respective one of a plurality of non-ferrous rotary discs each provided on at least a part of the perimeter with a ferrous element capable of receiving and maintaining said impressed magnetic field, said discs being secured on a common drive shaft powered through reduction gearing from an electric motor synchronized with a generator driven by the conveyor.

10. The system as recited in claim 1, said means for impressing said magnetic fields upon the memory devices comprising, for each said device, a normally incomplete D.C. electric circuit including an electro-magnetic core and a switch for closing said D.C. circuit closed and opened by the energizing and deenergizing, respectively, of a relay included in a normally incomplete A.C. electric circuit closed by concerted action of two switches one of which opens and closes periodically in timed concert with the travel of the conveyor and the other of which is manually operated.

11. A system according to claim 10 characterized in that operation of such manually operated switch so as to complete said A.C. circuit also completes a respective normally incomplete D.C. electric circuit including a respective holding coil, a manually operated clearing button being provided common to said last-named D.C. circuits for all of said manually operated switches.

12. A memory device comprising a non-ferrous rotating disc having throughout its perimeter a succession of closely spaced ferrous pins each disposed parallel to the rotary axis of the disc, a first, a second, and a third electric device each occupying a respective localized station successively traversed by the pins as they rotate with the disc, said first electric device being normally inactive and operating when electrically activated to impress a magnetic field upon the pins traversing the concerned station, the second electric device being a proximity switch immovable circumferentially of the disc and being excited by passing through the field of an electric magnet and being included in a normally incomplete electric circuit completed upon such excitation of the device, said circuit also including an answering device operated by electric current and thus causing said answering device to respond instantly upon such excitation of the second electric device, the third electric device operating to erase an impressed magnetic field, and means operable at will for electrically activating said first electric device.

13. A memory device comprising a non-ferrous rotating disc having throughout its perimeter a succession of identical ferrous pins of small diameter each disposed parallel to the rotary axis of the disc in such closely spaced relation as to leave gaps no wider than is necessary to isolate each such pin from a magnetic field impressed upon a next adjacent pin, a first, second, and a third electric device each occupying a respective localized station successively traversed by the pins as they rotate with the disc, said first electric device being normally inactive and operating when electrically activated to impress a magnetic field upon the pins traversing the concerned station, the second electric device being a proximity switch immovable circumferentially of the disc and being excited by passing through the field of an electric magnet and being included in a normally incomplete electric circuit completed upon such excitation of the device, said circuit also including an answering device operated by electric current and thus causing said answering device to respond instantly upon such excitation of the second electric device, the third electric device operating to erase an impressed magnetic field, means operable at will for electrically activating said first electric device, and means operating to automatically inactivate said first electric device following a given time interval.

14. The memory device recited in claim 13 in which the first electric device admits of being stationed in a selected circumferentially adjusted position within a given arc projected about the rotary axis of the disc as a center.

15. The memory device recited in claim 16 characterized in that the ferrous pins are circular in cross-section and receive a removable snap fit in matching sockets of a semi-cylindrical shape in cross-section provided by and extending about the entire perimeter of the disc.

16. A memory device according to claim 18 characterized in that the sockets are formed in a belt fixed to the disc, the material of which said belt is composed being non-conductive to the transfer of electric current.

References Cited in the file of this patent

UNITED STATES PATENTS

| | | |
|---|---|---|
| 2,770,796 | Boer | Nov. 13, 1956 |
| 2,923,420 | Dyer | Feb. 2, 1960 |
| 2,941,666 | Sima | June 21, 1960 |